(12) United States Patent
Chun et al.

(10) Patent No.: US 6,221,523 B1
(45) Date of Patent: Apr. 24, 2001

(54) DIRECT DEPOSIT OF CATALYST ON THE MEMBRANE OF DIRECT FEED FUEL CELLS

(75) Inventors: William Chun, Los Angeles; Sekharipuram R. Narayanan, Altadena; Barbara Jeffries-Nakamura, San Marino; Thomas I. Valdez, Covina; Juergen Linke, West Covina, all of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/021,692

(22) Filed: Feb. 10, 1998

(51) Int. Cl.[7] ........................................ H01M 4/86
(52) U.S. Cl. ................ 429/40; 429/41; 429/42; 429/30; 429/33

(58) Field of Search .................... 204/283, 284, 204/292, 296; 429/33, 30, 40–42; 427/115, 427; 239/270, 302, 318, 338, 546, 573; 29/623.5, 730, 746

(56) References Cited

U.S. PATENT DOCUMENTS

| | | | |
|---|---|---|---|
| 3,776,462 | 12/1973 | Payne, Jr. | 239/134 |
| 5,561,000 | 10/1996 | Dirven et al. | 429/42 |
| 5,643,689 | 7/1997 | Fleischer et al. | 429/33 |

*Primary Examiner*—Bruce F. Bell
(74) *Attorney, Agent, or Firm*—Fish & Richardson, P.C.

(57) ABSTRACT

An improved direct liquid-feed fuel cell having a solid membrane electrolyte for electrochemical reactions of an organic fuel. Catalyst utilization and catalyst/membrane interface improvements are disclosed. Specifically, the catalyst layer is applied directly onto the membrane electrolyte.

5 Claims, 6 Drawing Sheets

DIRECT DEPOSIT OF CATALYST ON THE MEMBRANE OF DIRECT FEED FUEL CELLS

ORIGIN OF INVENTION

The invention described herein was made in the performance of work under a NASA contract, and is subject to the provisions of Public Law 96-517 (35 USC 202) in which the Contractor has elected to retain title.

FIELD

This disclosure generally relates to organic fuel cells and in particular liquid feed organic fuel cells and the manufacturing thereof.

BACKGROUND

Fuel cells are electrochemical cells in which a free energy change resulting from a fuel oxidation reaction is converted into electrical energy. Fuel cells use renewable fuels such as methanol; typical products from the electrochemical reactions are mostly carbon dioxide and water. Fuel cells can be an attractive alternative to the combustion of fossil fuels.

In the past, fuel cells used reformers to convert methanol into hydrogen gas for use by the fuel cells. Direct oxidation fuel cells offer considerable weight and volume advantage over the indirect reformer fuel cells. However, initial direct oxidation models used a strong acid electrolyte which caused corrosion, degradation of catalyst, and other problems that compromise efficiency. Problems associated with such conventional direct liquid-feed cells are well recognized in the art.

Jet Propulsion Laboratory (JPL) developed an improved direct liquid-feed cell using solid-state membrane electrolyte. The JPL fuel cell eliminates the use of liquid acidic and alkaline electrolyte and therefore solves many problems in the conventional fuel cells. The subject matter of this improvement is described in U.S. Pat. No. 5,599,638, U.S. patent application Ser. No. 08/569,452 filed Dec. 8, 1995, now U.S. Pat. No. 5,773,162 and U.S. patent application Ser. No. 08/827,319, filed Mar. 26, 1997, now U.S. Pat. No. 5,945,231 the disclosures of which are herewith incorporated by reference to the extent necessary for proper understanding.

FIG. 1 illustrates a typical structure 100 of a JPL fuel cell with an anode 120, a solid polymer proton-conducting cation-exchange electrolyte membrane 110, and a cathode 130 enclosed in housing 102. An anode 120 is formed on a first surface of the membrane 110 with a first catalyst for electro-oxidation and a cathode 130 is formed on a second surface thereof opposing the first surface with a second catalyst for electro-reduction. The anode 120, membrane 110, and the cathode 130 are hot press bonded together to form a composite multi-layer structure called the membrane electrode assembly (MEA). An electrical load 140 is connected to the anode 120 and cathode 130 for electrical power output.

The membrane 110 divides the fuel cell 100 into a first section 122 on the side of the anode 120 and a second section 132 on the side of the cathode 130. A feeding port 124 in the first section 122 is connected to a fuel feed system 126. A gas outlet 127 is deployed in the first section 122 to release gas therein and a liquid outlet 128 leads to a fuel re-circulation system 129 to recycle the fuel back to the fuel feed system 126. In the second section 132 of the cell 100, an air or oxygen supply 136 (e.g., an air compressor) supplies oxygen to the cathode 130 through a gas feed port 134. Water and used air/oxygen are expelled from the cell through an output port 138.

During operation, a mixture of an organic fuel (e.g., methanol) and water is fed into the first section 122 of the cell 100 while oxygen gas is fed into the second section 132. Electrochemical reactions happen simultaneously at both the anode 120 and cathode 130, thus generating electrical power. For example, when methanol is used as the fuel, the electro-oxidation of methanol at the anode 120 can be represented by:

Anode: $CH_3OH + H_2O \rightarrow CO_2 + 6H^+ + 6e^-$ and the electro-reduction of oxygen at the cathode 130 can be represented by:

Cathode: $O_2 + 4H^+ + 4e^- \rightarrow 2H_2O$

Thus, the protons generated at the anode 120 traverse the membrane 110 to the cathode 130 and are consumed by the reduction reaction therein while the electrons generated at the anode 120 migrate to the cathode 130 through the electrical load 140. This generates an electrical current from the cathode 130 to the anode 120. The overall cell reaction is:

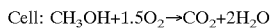

Cell: $CH_3OH + 1.5O_2 \rightarrow CO_2 + 2H_2O$

The energy generated by JPL's direct feed fuel cell and the advantages of using a solid electrolyte membrane fostered further research. Efforts are targeted toward improving manufacturing efficiency while achieving better performance at reduced cost.

Prior art for preparing methanol fuel cell's membrane electrode assembly, as disclosed in U.S. Pat. No. 5,599,638 and U.S. patent application Ser. No. 08/569,452, involves the formation of catalyst layers on a porous carbon substrate which is then mounted on either side of a solid electrolyte membrane. Although considerable energy output has been achieved at high catalyst loading levels, there may be significant performance limitations associated with this process.

In some resulting catalyst layers, at least fifty percent of the catalyst gets impregnated deep in the pores of the carbon substrate. Hence, the impregnated catalyst are inaccessible for electrochemical reaction and are essentially wasted. Some prior art methods of preparing membrane electrode assemblies for direct methanol fuel cells employ excessive catalyst. Improved techniques of catalyst application may help reduce the amount of catalyst necessary for attaining the desired performance levels. Reduction of the use of expensive catalyst and more efficient catalyst utilization are improvements that may propel this technology toward commercialization.

Another obstacle to desired performance levels is inadequate catalyst/membrane interface. A large area of electrochemically active interface between the carbon-paper coated catalyst layer and the membrane is usually desired for attaining maximum energy output by a particular fuel cell. There are some prior art methods that rely on heat and pressure for membrane electrode assembly fabrication. Since the catalyst layer is kept relatively dry after application of the catalyst onto the carbon paper substrate, the interface formed between the catalyst layer and the membrane is usually not optimum. Improved methods to enhance the area of electrochemical contact at the catalyst layer/membrane interface are desired for attaining high performance levels.

SUMMARY

The inventors disclose a direct feed fuel cell that can be manufactured efficiently while producing better performance at a reduced cost. This direct feed fuel cell features improved catalyst utilization and enhanced catalyst layer/membrane interface.

A process of catalyst application is presented. Instead of coating catalyst layers onto a support substrate, the catalyst mixture is applied directly onto the membrane. This method involves pre-treatment of the membrane in swelling agents, direct application of catalyst mixture onto the pre-treated membrane, and subsequent slow evaporation of the catalyst coating. Direct application of catalyst onto the membrane reduces catalyst waste due to impregnation of the catalyst into the support substrate.

The direct coating process also improves interfacial contact. Softening the membrane by pre-swelling and the proximity of the uniformly deposited catalyst layer to the membrane enhance the interfacial contact area formed between the electrode and the membrane.

This method of directly applying catalyst layers on the membrane offers very high catalyst utilization and improved catalyst/membrane interface. Laboratory tests reveal that at low catalyst loading levels, e.g. 2–3 mg/cm$^2$, a fifty percent increase in power density can be achieved using this method. Such results demonstrate significant improvements in fuel cell performance by depositing the catalyst directly on the membrane.

In an effort to bring this innovation closer to efficient mass production, the present inventors further developed a direct spray deposition process. The spray deposition process produces uniformly thin catalyst layers and has the flexibility of producing well-defined multiple thin layers of different composition. The catalyst ink is adjusted to a sprayable composition and is spray deposited onto a pre-treated membrane; during the spraying process the coating is dried using warm air guns. The inventors disclose sprayer apparatuses adapted for catalyst or slurry deposition. These sprayer apparatuses produce slow and fine sprays without nozzle clogging. The new sprayer designs allow uniform controlled deposition of multiple thin layers at low rates and without wastage of catalyst material.

These features save time, allows attainment of high power densities at low catalyst loading levels, and are amenable to efficient production of fuel cells. This technology may be useful for portable power applications in the range of 50 Watts to 5000 Watts, such as military communications, emergency power, and vehicle power.

BRIEF DESCRIPTION OF THE DRAWING

These and other advantages of the present invention will become more apparent in light of the following detailed description of preferred embodiment thereof, as illustrated in the accompanying drawings, in which.

DESCRIPTION OF THE PREFERRED EMBODIMENTS

Figure 1:
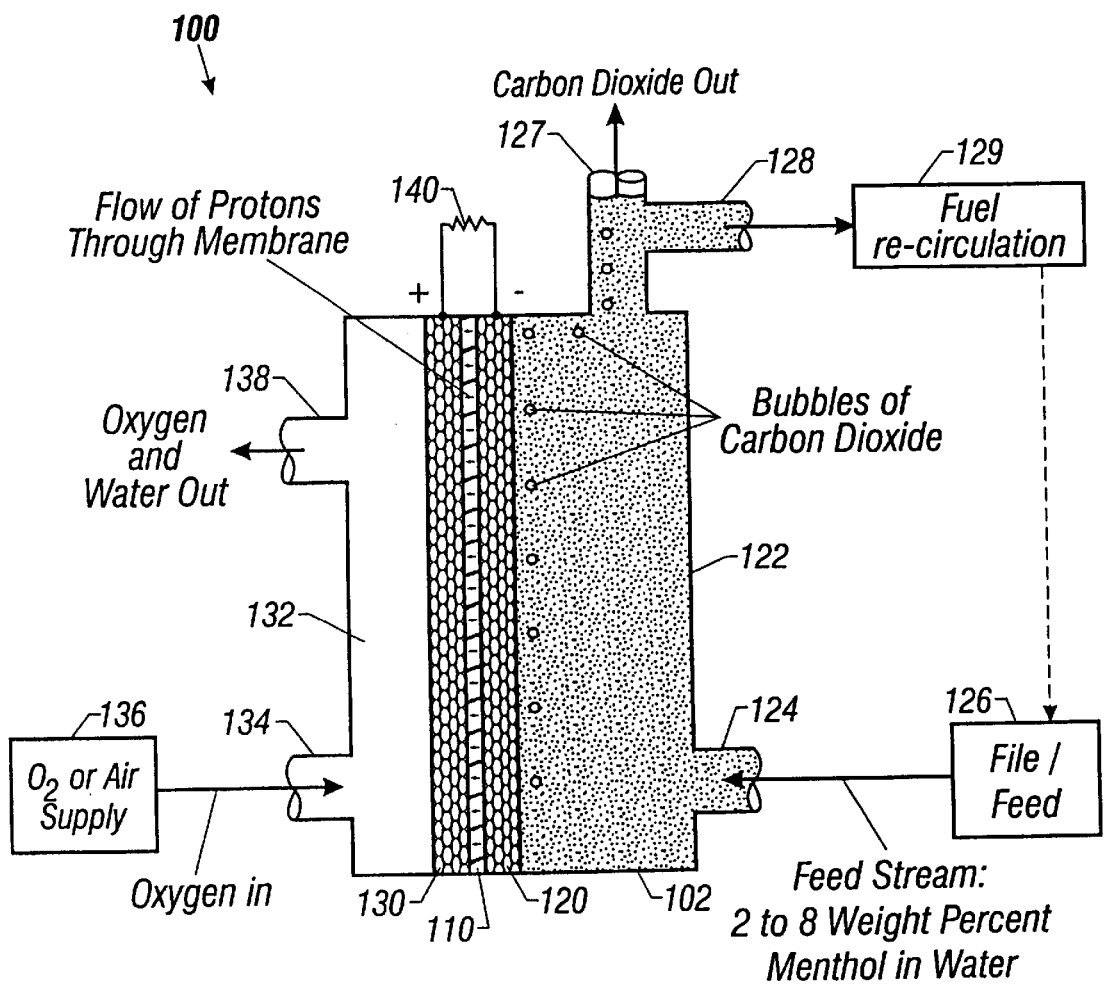
FIG. 1 shows a typical direct liquid-feed fuel cell having a solid-state membrane electrolyte.
Figure 1:
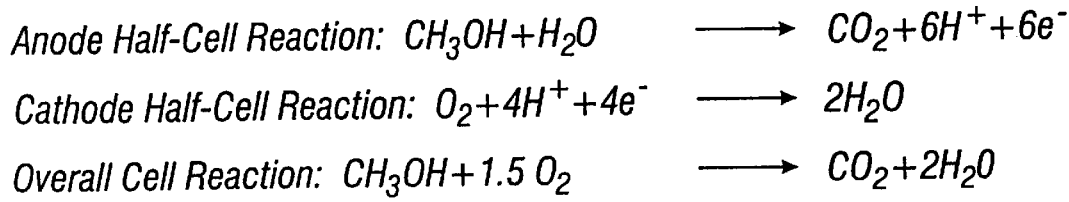

The membrane electrode assembly (MEA) is a component of the direct methanol fuel cell that has been continuously advanced at Jet Propulsion Laboratory. FIG. 1 illustrates the typical JPL fuel cell. The present specification describes improvements in the fabrication of the membrane electrode assembly. In summary, the technique includes: 1) Pre-treatment of the membrane with swelling agents; 2) Preparation of the catalyst ink especially formulated for the mode of application; 3) Application of the catalyst layer on the membrane in a defined area and subsequent drying of the catalyst layer on the membrane; 4) Hot pressing of the porous current collection substrate on both sides of the catalyst coated membrane to form a membrane electrode assembly. This technique is described in detail herein.

1. Pre-treatment of the Membrane

The NAFION™ membrane which is conditioned in water has been found to wrinkle and deform when the catalyst ink is brought in contact with the membrane. The catalyst ink includes catalyst, aliphatic alcohols, and dissolved NAFION™ ionomer. Since the solvent of the catalyst contains alcohol, a membrane soaked in pure water will wrinkle upon contact with the catalyst. As a result, a non-uniform catalyst layer may be formed.

Some approaches in the past have applied the catalyst on the membrane by starting from a precursor of the membrane. These previous methods involve several processing steps before the final acid form of NAFION™ can be obtained. These methods are laborious and multiple steps can be detrimental to the catalyst itself.

The membrane conditioned in water is allowed to soak in a water-alcohol mixture. Solutions of 10%–90% isopropanol in water can be used. In a preferred embodiment, the membrane is soaked in a 50% isopropanol solution for 24 hours. Similar effective results could be obtained over a wide range of compositions having at least 10% isopropanol and the rest being mostly water. Methanol and other aliphatic alcohols can also be used instead of isopropanol.

Pre-treatment of the membrane reduces wrinkling during catalyst contact since the membrane and the catalyst layer have similar solvent compositions. Pre-treatment also improves catalyst bonding to the membrane. After pre-treatment, the membrane becomes very soft. The catalyst layer integrates with the membrane more readily during the drying stages and in the hot pressing phase.

The pre-treated membrane is stored wet. When the catalyst ink is ready to be applied onto the membrane, the membrane is then held in a non-corrodible frame to prevent contamination of the NAFION™ membrane.

2. Preparation of the Catalyst Ink

The catalyst layer is formulated from an ink consisting of a selected catalyst material, polytetrafluoroethylene and perfluorovinylether sulfonic acid such as NAFION™ by DUPONT™, and polytetrafluoroethylene, e.g. TEFLON™, mixed together in appropriate proportions. The ink mixture preferably includes approximately 150 mg of catalyst, which can include platinum and/or platinum-ruthenium catalyst, 0.7–1.4 g of 5% NAFION™ ionomer solution, and 0.2–0.4 g of a TEFLON™ emulsion such as PTFE-30 diluted to 11% in solids. The solvent includes water and isopropanol. Preferable ink compositions use very little or none of the TEFLON™ additive. This ink is separately prepared with platinum for the cathode, and platinum-ruthenium for the anode. Inks using other catalyst can also be formulated in this manner.

The mixture formed from the foregoing constituents is mixed by an ultrasonic bath. A viscous ink results after the mixing. The viscosity of this ink is adjusted to the specific mode of application. An ink prepared for direct pour deposition is more viscous than an ink prepared for direct spray deposition. A sprayable composition is prepared by adding appropriate amounts of water and isopropanol.

The amount of ink needed is dependent on the catalyst loading area of electrode desired. In a preferred embodiment, a loading level of 2–3 mg/cm$^2$ of the catalyst is used for the direct pour deposition process. In the direct spray deposition process, a loading level of 1–2 mg/cm$^2$ of the catalyst is used.

Figure 2A:
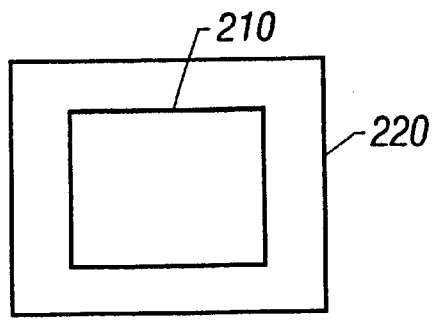
FIGS. 2A–2C show direct pour deposition process.
Figure 2B:
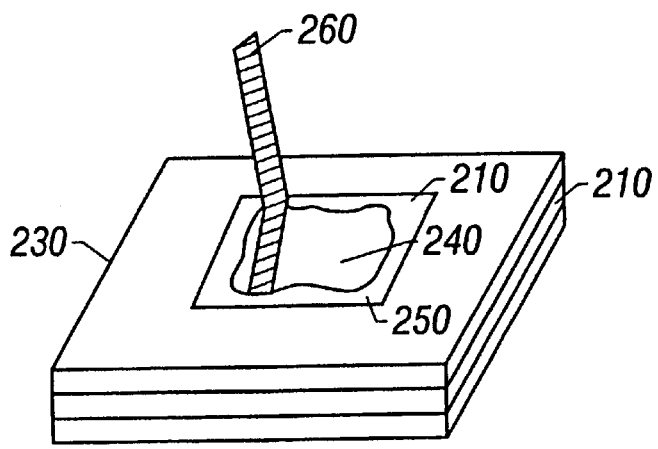
Figure 2C:
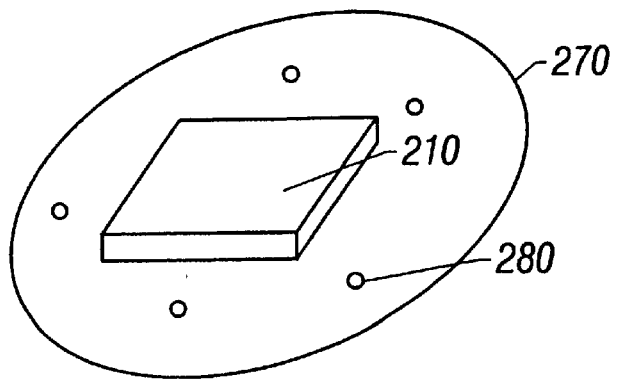

3. Direct Catalyst Application Onto the Membrane and Subsequent Drying Techniques Direct Pour Deposition FIG. 2A shows a pre-treated membrane 210 spread on a fine absorbent lint-free tissue 220 while the membrane 210 is still wet. After this, the membrane 210 is held in position by a frame 230 as shown in FIG. 2B. A catalyst coating 240 is poured and spread over a defined area 250 of the membrane 210. The spreading can be accomplished using a glass rod 260. The membrane 210 is kept on a flat surface to ensure that the poured coating 240 evenly coats the membrane 210 surface and uniform thickness results. The entire membrane 210 and the coating 240 is sealed off in a polyethylene bag 270 with very small orifices 280 for the escape of moisture/alcohols during slow evaporation of the ink as shown in FIG. 2C.

This controlled evaporation of the ink allows slow evaporation which produces a uniform, crack-free coating. After 24–48 hours the coating is dry. The membrane is recovered and taken through a hot pressing process.

Direct Spray Deposition

Figure 3:
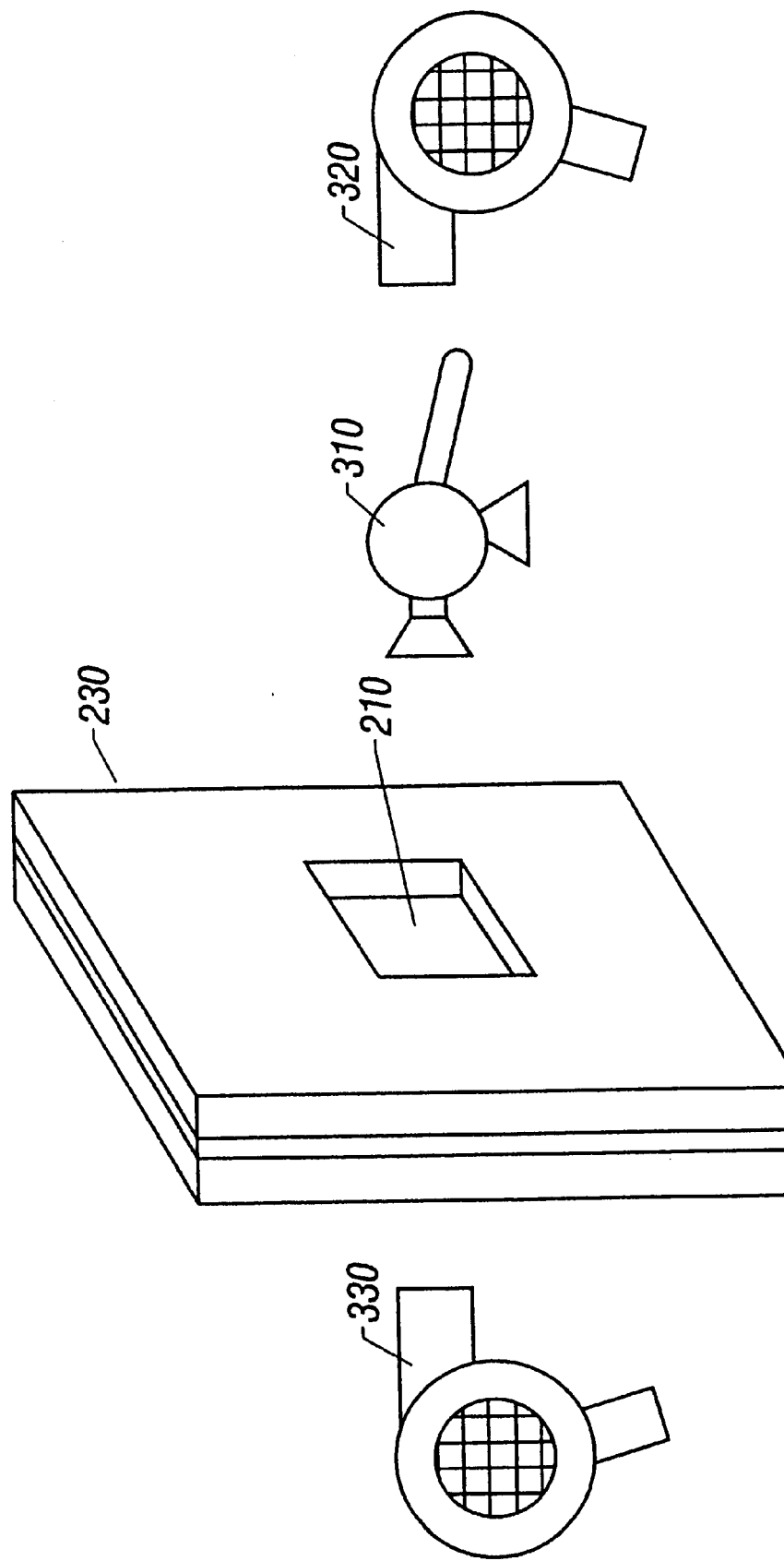
FIG. 3 show direct spray deposition.

The pre-treated membrane 210 is held in a non-corrodible frame 230 as shown in FIG. 3. This ensures that the membrane dimensions are not altered during spraying and drying of the catalyst layers. Once the membrane 210 is pre-treated and held in the frame 230, the membrane 210 is sprayed.

The pre-treated membrane 210 is held in a frame 230, e.g. a rotating dual cut-out mounting jig. A sprayer applicator 310 is fixed at a predetermined distance. Two blower/heat guns 320, 330 are fixed at either side of the frame 230.

The performance requirement for sprayers for precious metal catalyst inks can be very demanding if the quality of the resulting spray coating is to be satisfactory. Some of desirable features include the following: The platinum-containing catalyst ink can be very expensive. Therefore, the unit should be capable of handling very small volumes of spray solution. The unit should be able to spray directly on a desired area without wastage of material. Preferably, the unit produces very fine droplet sizes, a fine mist. The desired unit is also capable of very low velocity mist transport. The unit should be able to maintain a continuous spray without nozzle clogging. Nozzle and container should be chemically stable to the constituents of the ink. The unit should also be easy to clean and should be protected from contamination.

Figure 4A:
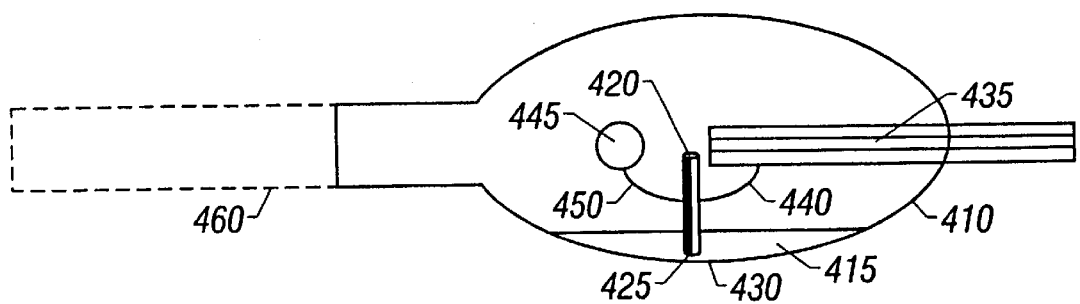
FIG. 4A shows sprayer 1.
Figure 4B:
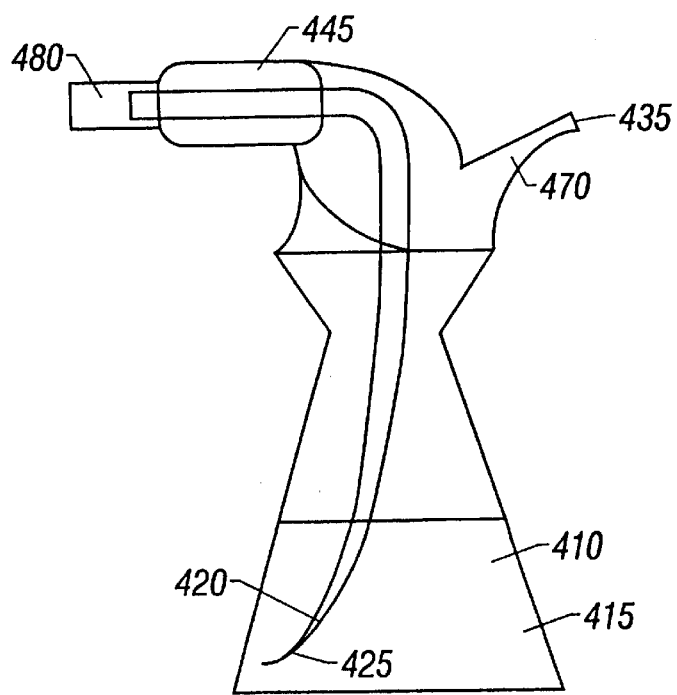
FIG. 4B shows sprayer 2.

Two sprayer devices, sprayer 1 and sprayer 2, are respectively shown in FIG. 4A and FIG. 4B. These sprayers may be used for other applications such as coating other materials. These materials include, but are not limited to, battery electrodes, surface finishing materials, corrosion inhibitors, coloring layers, and masking layers.

FIG. 4A illustrates sprayer 1. Sprayer 1 has a material reservoir chamber 410 for storing catalyst materials 415 prior to dispensing. A venturi feed tube 420 is set inside the material reservoir chamber 410 with one end 425 of the feed tube perpendicular to the bottom 430 of the reservoir and in contact with the catalyst material 415. An air supply 435 is connected to one side of the venturi feed tube 420 by a first conduit 440. A misting sphere 445 is connected to the other side of the venturi feed tube 420 by a second conduit 450. The misting sphere 445 provides the atomization of the sprayed particles. The misting sphere 445 also helps to control the spray rate. An exit stem 460 is coupled to the material reservoir chamber 410. The exit stem 460 length is tuned for fine mist adjustment. The diameter of the exit stem opening is 3 mm.

Sprayer 2, shown in FIG. 4B, has a material reservoir chamber 410 for storing catalyst materials 415 prior to dispensing. A venturi feed tube 420 is positioned within the material reservoir chamber 410, the venturi feed tube 420 has one end 425 in contact with the catalyst materials 415. An air supply 435 is attached to the material reservoir chamber 410 via an inlet conduit 470. The venturi feed tube 420 sends the catalyst material 415 from the material reservoir chamber 410 to the misting sphere 445. The misting sphere 445 is connected to an exit tube 480. The exit tube 480 arrangement eliminates the loss of catalyst materials 415.

In both sprayer devices, air from a pressure vessel is used as the spray vehicle. The rates of air flow are controlled to regulate the spray characteristics. Both devices incorporate a venturi feed tube. A venturi feed tube is a short tube with a tapering constriction in the middle that causes an increase in the velocity of flow of a fluid and a corresponding decrease in fluid pressure. This tube is used for creating a suction. The sprayer devices are capable of producing a low velocity spray that deposits an uniform mono-layer of catalyst onto the pre-treated membrane.

The sprayable catalysts ink is transferred into one of the sprayers. The spray from that sprayer is directed to the open area of the pre-treated wet membrane where the coating is desired. The distance between the sprayer and the membrane is so adjusted that the sprayed material does not dry out before it reaches the membrane. This assures that the spray deposited material bonds to the membrane and forms an electrochemically active interface. After a thin layer has been deposited, the coating is still very moist.

The moist spray coated area is then allowed to dry by directing a stream of air on the coated surface. The rate of air flow is adjusted such that it is enough to cause drying without causing the deposit to crack or dislodge from the surface. Warm air, 40–60 degrees Celsius, can be used to enhance the rate of drying. The passage of air across the surface of the coating prevents cracking and ensures formation of a uniform coating.

After the coating has reached the desired level of dryness, additional layers may be applied by the same procedure including consecutive spraying and drying steps. This process is called alternative-side spraying. The layers are applied on the anode side and the cathode side of the membrane alternatively to minimize any stresses due to the coating process. In a preferred embodiment, alternative side coating is accomplished by rotating the frame 230 after each application so that the spray applicator 310 can deposit catalyst on the other side of the membrane 210. A single coat can deposit as little as 0.1 mg/cm$^2$ of catalyst material to the surface. The process is repeated until approximately 1–2 mg/cm$^2$ of catalyst is loaded onto the membrane.

4. Membrane Electrode Assembly

After coating the desired amount of catalysts on both sides of the membrane, the coated membrane is released from the frame and is ready for hot pressing with support substrates, preferably carbon paper supports. Before hot pressing, the carbon paper supports are prepared. The anode paper is plain TGPH-090 or 060 paper which is manufactured by Toray Inc. The cathode is also the same type of paper except it is taken through a standard teflonization process described in U.S. Pat. No. 5,599,638 and U.S. patent application Ser. No. 08/569,452 (Patent Pending). The degree of teflonization of the paper on the cathode is 5% in a preferred embodiment. However, the degree of teflonization can be varied from 5%–20% to obtain enhanced air electrode performance.

The coated membrane is sandwiched between the anode and cathode supports and held in the press for 10 minutes under a pressure that can vary from 500 psi–1500 psi. For papers that are thin, such as the TGPH-060 (six millimeters thick), the preferred pressures are close to 500 psi. With thicker papers the optimum pressures are as high as 1250 psi.

After 10 minutes of pressure, heating is commenced. The heat is slowly ramped up to about 145° C. The slow ramping up should take place over 25–30 minutes, with the last 5 minutes of heating being a time of temperature stabilization. The heat is switched off, but the pressure is maintained. The press is rapidly cooled using circulating water while the pressure is maintained. On cooling to about 60° C., the membrane-electrode assembly is removed from the press and stored in water in a sealed plastic bag.

Electrical Performance Evaluation

Electrical performance evaluation is carried out in a standard laboratory setup which allows circulation of methanol solutions past the anode and air/oxygen across the cathode. The current-voltage performance of a fuel cell at 90° C. is evaluated.

Figure 5A:
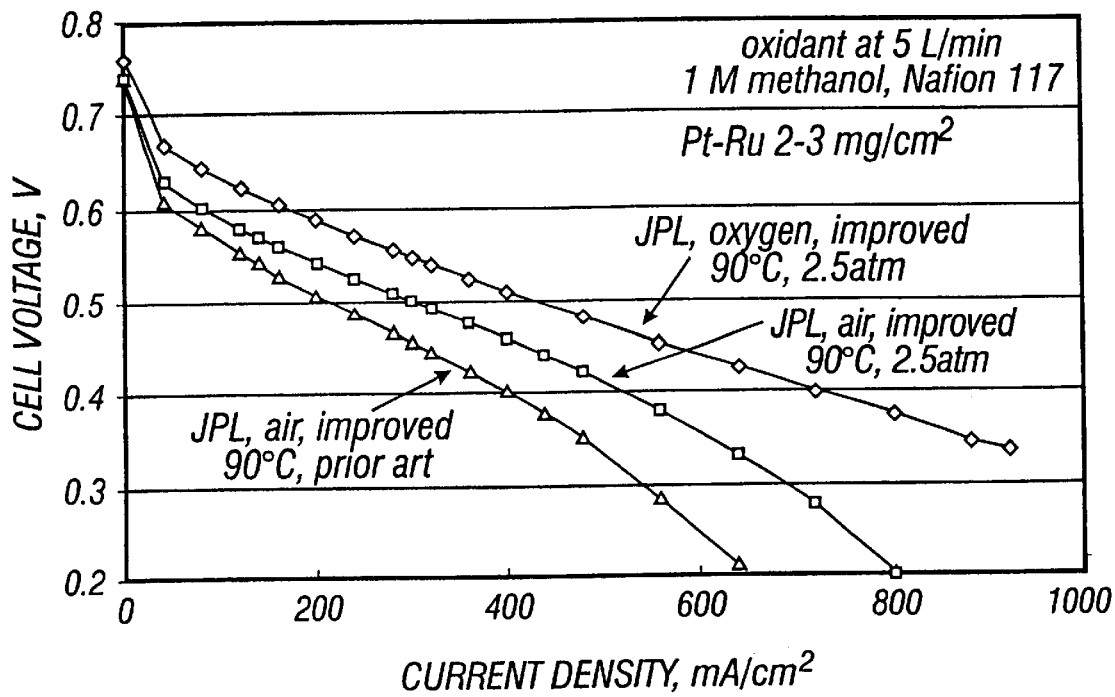
FIGS. 5A–5B are graphs illustrating performance of MEA utilizing direct pour deposition.

FIG. 5A illustrates the performance enhancement of a fuel cell in which the membrane electrode assembly is fabricated by a direct pour deposition process compared to prior JPL fuel cell models as described in U.S. Pat. No. 5,599,638 and U.S. patent application Ser. No. 08/569,452 (Patent Pending). The current performance is 0.5 V at 300 mA/cm$^2$ on air at 2.5 atm at 90° C. Under similar conditions, the performance on oxygen is 0.55 V at 300 mA/cm$^2$. Prior art devices, by contrast, produces 0.45 V at 300 mA/cm$^2$ on air.

Figure 5B:
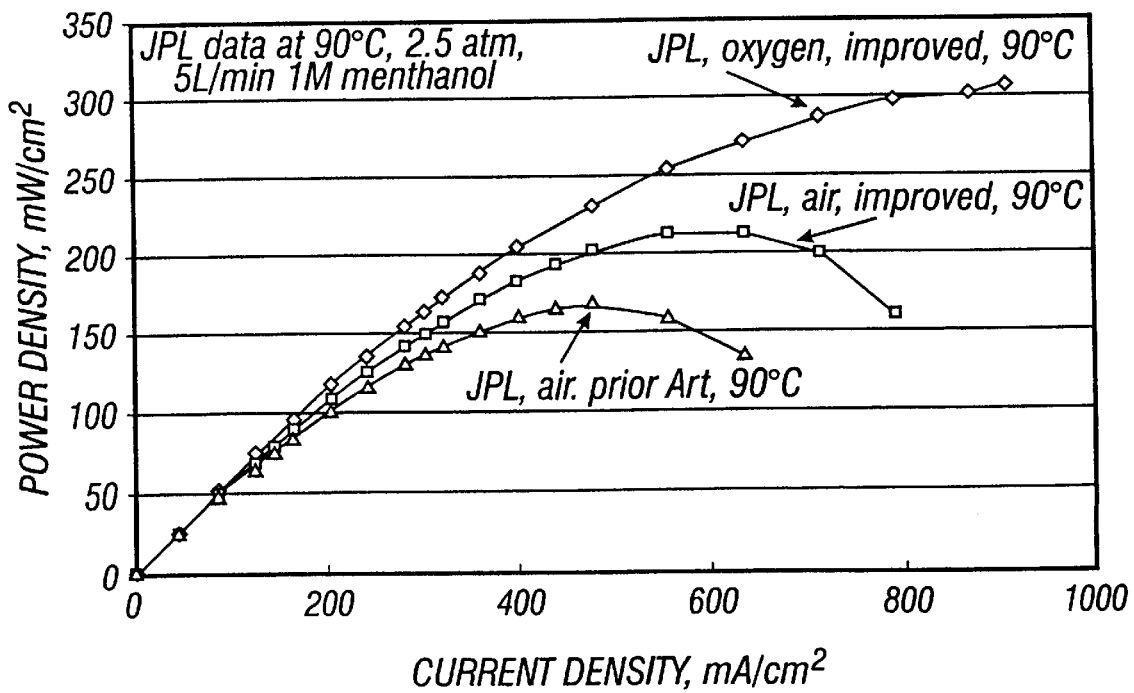

The improvement is even better represented by the increase in peak power density as shown in FIG. 5B. The peak power density has been significantly increased from 160 mW/cm$^2$ to 210 mW/cm$^2$. This means that the fuel cell stacks operating with this new performance level would be 25% lower in weight and volume compared to the prior art.

Figure 6:
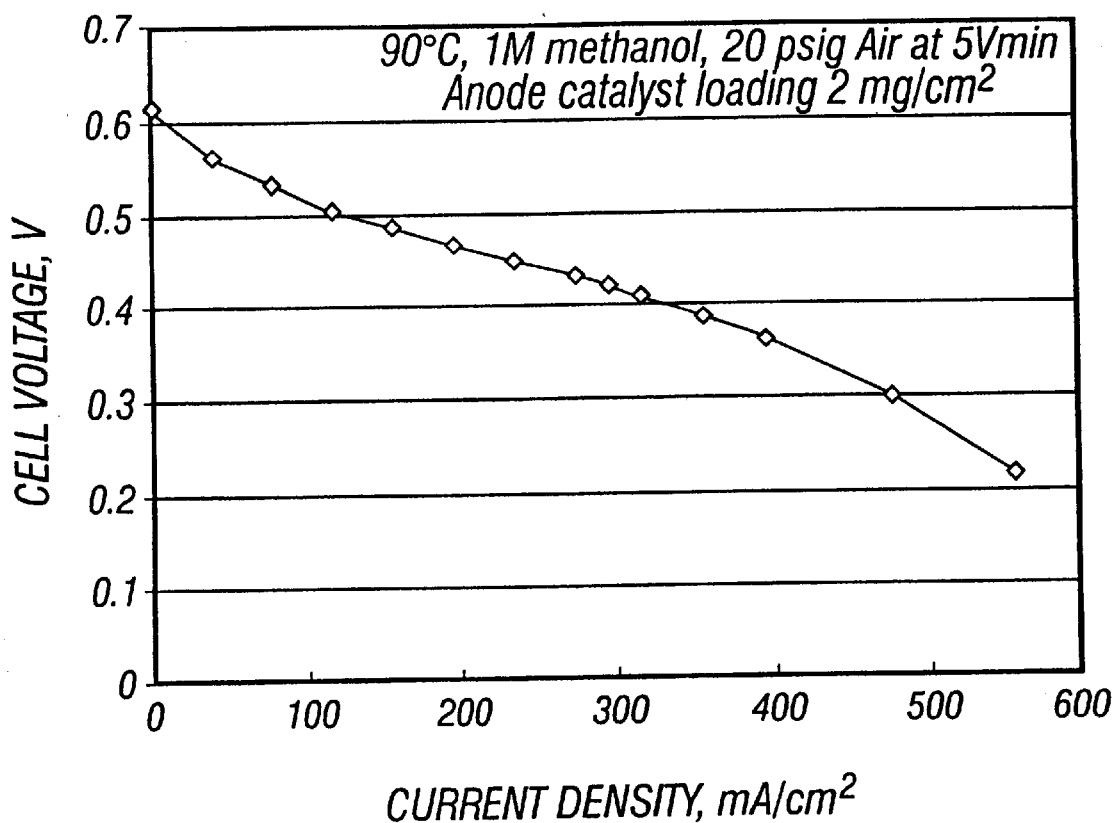
FIG. 6 is a graph illustrating performance of MEA utilizing direct spray deposition.

FIG. 6 illustrates the performance of a fuel cell in which the membrane electrode assembly is fabricated by a direct spray deposition process. The performance of fuel cells using these MEAs is compared with the performance of those produced by the prior art as described in U.S. Pat. No. 5,599,638 and U.S. patent application Ser. No. 08/569,452 (Patent Pending). Direct spray deposition process uses half the amount of catalyst (1–2 mg/cm$^2$ as opposed to 4 mg/cm$^2$ used in the prior art) and delivers comparable performance levels as earlier technologies. This demonstrates the higher utilization levels attained by the new technology. These results are produced using a method that is readily adapted to lower cost mass production. Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A membrane electrode assembly for fabricating direct feed fuel cells comprising:

a solid electrolyte membrane having a first membrane surface and a second membrane surface, said second membrane surface being positioned on a back side of said first membrane surface;

a first catalyst layer directly affixed to said first membrane surface;

a second catalyst layer directly affixed to said second membrane surface;

a first support substrate positioned on said first membrane surface; and a second support substrate positioned on said second membrane surface;

wherein said assembly is substantially free of catalyst embedded within said first support substrate and said second support substrate.

2. A device as in claim 1, wherein said catalyst layers are loaded to 2–3 mg/cm$^2$.

3. A device as in claim 1, wherein said catalyst layers are loaded to 1–2 mg/cm$^2$.

4. A device as recited in claim 1, wherein said first support substrate is prepared from carbon paper.

5. A device as recited in claim 1, wherein said second support substrate is prepared from carbon paper wherein said paper is taken through a 5–20% teflonization process.

* * * * *